Patented Aug. 15, 1950

2,518,956

UNITED STATES PATENT OFFICE 2,518,956

ANION EXCHANGE RESINS

Sidney Sussman, Moorestown, N. J., assignor to The Permutit Company, New York, N. Y., a corporation of Delaware No Drawing. Application July 11, 1945, Serial No. 604,515

22 Claims. (Cl. 260—17.3)

This is a continuation-in-part application of the copending application Serial No. 447,275, filed June 16, 1942, on which U. S. Patent 2,442,989 was granted on June 8, 1948.

This invention relates to water insoluble resin products particularly adapted for use as anion exchangers, to the preparation of such products and to the treatment of liquids with such products for effecting anion exchange reactions.

One object of this invention is the provision of improved methods of preparing resins under carefully controlled conditions which do not require extensive heating or the use of expensive or complicated apparatus.

A further object of this invention is the provision of anion exchange resins prepared by reaction of a polyalkylene polyamine, an aldehyde and a nitroalkane containing at least two labile hydrogen atoms capable of reacting with formaldehyde to form methylol compounds.

A further object of this invention is the provision of products prepared by reaction of a polyalkylene polyamine, a nitroalkane, and a saccharide, or a substance that hydrolyzes readily to form a saccharide.

Another object is the preparation of resins by reacting a polyalkylene polyamine with a preliminary condensation product of an aldehyde and a nitroalkane containing at least two labile hydrogen atoms capable of reacting with formaldehyde to form methylol compounds.

A further object of this invention is the preparation of a resin of the foregoing type which is specially heat treated to improve the physical properties of the product and render it less soluble in acid solutions.

A further object of this invention is the provision of a controlled process of decrepitation of the dried resins to produce a product having a regulated grain size that is not subject to substantial re-decrepitation.

In accordance with my invention, the free polyalkylene polyamine is simply mixed with the other ingredients in suitable proportions to form a gel. Extensive heating is unnecessary since the reaction is exothermic. In fact, under most conditions, it is desirable to cool the mixture in order to control the temperature. This procedure has many obvious advantages over any process requiring the use of reflux equipment.

Less expensive equipment can be used when the reaction mixture is not acid because of the elimination of the corrosion problem to a large extent. In addition, I have found that the process of gelation can be controlled much better by this procedure; and since the gel can be formed in an open vessel, it is much easier to handle on a large scale.

The condensation may be carried out with cooling at a relatively low temperature, or at higher temperatures up to the boiling point of the reacting mass. In fact, higher condensation temperatures tend to produce resins of higher density so that it may be advantageous to reflux the ingredients if a high density is needed.

The various polyalkylene polyamines that may be used include triethylene tetramine, tetraethylene pentamine and the like. The amines containing four or more nitrogen atoms are preferred. Likewise, the various common aldehydes such as formaldehyde, furfural or paraformaldehyde may be employed, or the mono- or polysaccharides such as glucose or sucrose can be substituted for all or a portion of the simpler aldehydes.

I have found that compounds with at least two labile hydrogen atoms capable of reacting with formaldehyde to form methylol compounds can be used to good advantage. Such compounds include the nitroalkanes, such as nitromethane, nitroethane or the like, which provide a resin product with nitro groups that can be reduced to amino groups, thus increasing the anion exchange capacity of the product.

The proportions of the ingredients may be varied substantially although for the best results, I prefer to use from 0.7 to 5 mols of amine for each mol of nitroalkane. A mol ratio of 1:1 or 2:1 is satisfactory under most conditions. The amount of aldehyde usually should be sufficient to provide at least two mols of aldehyde for each mol of nitroalkane. These proportions have been found to produce excellent yields of high capacity resin.

The ingredients can be mixed together in any order and still produce satisfactory resinous products. However, I have found that some advantage may be obtained if the nitroalkane is allowed to react with the aldehyde to some extent before the amine is added. The precondensation of these ingredients probably forms a mixture of methylol compounds which products in turn react with the amine to form the desired resin.

This pre-condensation procedure can be carried out readily by mixing the nitroalkane with the aldehyde in solution and adding a small proportion of any suitable base or other alkaline material. A small amount of the amine can be used as an alkaline catalyst, if desired, or various amines other than those used for forming the resin itself may be employed. Other suitable alkaline catalysts include the carbonates of sodium or potassium, caustic soda or potash, ammonia, lime, etc. In fact, practically any alkali that is sufficiently soluble is suitable as a catalyst.

The time of pre-condensation, which may be carried out conveniently at room temperature, will usually vary inversely with the amount of alkaline catalyst that is added. Of course, if higher temperatures are employed, the precondensation period may be correspondingly shortened. In general, this pre-condensation period may take from 1 hour or even less to 48 hours, depending upon the particular conditions and particular reagents employed. Excessively long pre-condensation periods do not appear to give as satisfactory resins as are obtained with shorter reaction periods. If the amine used in the final condensation reaction is employed as the alkaline catalyst, the amount can be varied widely from say 1 to 50%, or even more of the total quantity of amine to be employed.

Direct mixing of the reactants, whether pre-condensation is used or not, results in the formation of a viscous solution during the mixing period and gelation may take place practically as soon as the last of the reactants are added. In order to obtain a more uniform mixing and to permit better control of the reaction, I have found that dilution of one or more of the reactant liquids before the final mixing takes place, provides better uniformity and better control of temperature and time of gelation without adversely affecting the properties of the final resin. Any suitable solvent may be used as the diluent, although from the cost point of view, water is preferable. If desired, however, other solvents such as the lower alcohols may be employed. Dilution of the amine before reaction is particularly useful in this connection since these amines ordinarily dissolve in water with the evolution of heat. Consequently, if an amine solution is first prepared and then cooled, it is much easier to control the temperature of the reaction when this diluted amine solution is added to the other reactants.

In the use of a granular resin product as an anion exchanger, a quantity of the material is normally placed in the vessel in the form of a porous bed through which the water or other liquid to be treated can be percolated. This bed is then subjected to regeneration with a suitable alkaline solution from time to time and, of course, may be rinsed and backwashed between these stages, so that the physical properties of the product are quite important. It is desirable to have a product that is physically strong, resistant to abrasion, relatively insoluble in dilute acids and dilute alkalies and that is not brittle or otherwise subject to physical deterioration in use.

I have found that if resin gels of the polyalkylene polyamine-aldehyde-nitroalkane type are dried by heating for a time at a temperature below 100° C., such as in the range of 60–90° C. and then are given a final heat treatment at a temperature above 90° C. and preferably above 100° C., a product is obtained which has a greater resistance to solution in dilute acids and which is harder, more resistant to abrasion and otherwise has greatly improved physical properties compared with products dried by other procedures.

If the resin is dried entirely at a temperature of 100° C. or above, or if it is heated to such a temperature too quickly, the product is apt to become spongy and filled with small bubbles. On the other hand, if it is dried entirely at a temperature below 100° C., it is apt to be much softer and more soluble in acid solutions than a product dried by the multi-stage heating method outlined above.

The first stage of heat treatment removes moisture from the product and the second stage of heating apparently produces some chemical change in the product. The time of this second heating stage will depend on the temperature employed, longer times up to 40 or even 60 hours being required at temperatures of 100° C. or slightly below 100° C. in order to obtain substantial improvement of the product. Temperatures that are too high apparently produce some decomposition and, consequently, I prefer to carry out this heating entirely below 250° C.

Resins of the type described herein will decrepitate when placed in water, and this action may be used as a means of breaking the product up to a useful size. Contrary to decrepitation experience with many gels, these resin products actually form smaller particles in low temperature water than in high temperature water. Thus, by using warm water and control of the water temperature, the decrepitation of this product may be easily controlled to produce the desired final grain size. In addition, the decrepitation of the product is exothermic, so that it is desirable to provide some cooling means for controlling the water temperature or to use a controlled flow of water during the decrepitation treatment.

If these decrepitated granular resins are dried, they again decrepitate when placed in water. Such a procedure, of course, might result in undesirable reduction of particle size, and I have found that this re-decrepitation can be minimized or largely prevented by first subjecting the resin to the action of steam before it is moistened with water. The use of very hot water also helps to minimize re-decrepitation.

To further illustrate the features of my invention, the following examples of the preparation of resins are given, although it is to be understood that the invention is not limited to the details of procedure contained in these examples:

*Example 1.*—48 parts of 37% formaldehyde solution, 9.2 parts of nitromethane, and 2 parts of tetraethylene pentamine were mixed. After standing for 24 hours, 21 parts of tetraethylene pentamine were added at 40–45° C. Gelation occurred in about 15 minutes. The gel was dried at 60° C. for 24 hours and at 100° C. for 24 hours. After crushing and washing, the resin had an acid removal capacity of 495 milliequivalents per liter. The yield was 34 parts of dry resin.

In addition to the basic nitrogen atoms present in these resins by virtue of the polyalkylene polyamines used in their formation, there is present the non-basic nitrogen atom of the nitroalkane constituent. It is possible to increase the amino nitrogen content and thereby the acid removal capacity of all of the nitroalkane resins herein described by reducing the nitro groups. The reduction may be carried out by any of the standard methods for reducing nitro groups to amino groups. Among the methods which may be used for the reduction of the nitro groups present in these resins are catalytic hydrogenation with active platinum or Raney nickel catalysts, combinations of metals and acids, stannous chloride and acids, alkaline sulfides and ammonia, and others.

The nitro groups of the resin produced in this example were reduced by treating 17 parts of the dry resin with 42 parts of stannous chloride dihydrate and 41 parts of concentrated hydrochloric acid. The suspension was warmed for several hours during which part of the resin dissolved. The remainder of the resin was washed free of excess salts and was regenerated with alkali. This product had a better acid removal capacity than the non-reduced resin. If desired, the nitroalkane resins in each of the specific examples herein described may be reduced by this method.

*Example 2.*—To 9.2 parts of nitromethane was added 57.5 parts of 37% formaldehyde solution. 17.5 parts of triethylene tetramine was diluted with 15 parts of water and cooled to room temperature. The nitromethane-formaldehyde solution was cooled and the amine solution was added to it with vigorous stirring. An exothermic reaction occurred during the addition, and an opaque gel formed 5 minutes after the last of the amine was added. This gel was dried for 72 hours at 80° C. and for 8 hours at 110° C. The yield was 34.2 parts of dried resin. This was crushed to pass through a 16 mesh screen and was placed in hot water in order to avoid further size reduction by decrepitation. This resin, in the form of a bed about 9 inches deep was used to remove the acid from a water-containing 2.5 milliequivalents of sulfuric acid per liter and 1.5 milliequivalents of hydrochloric acid per liter. The capacity of the resin was 260 milliequivalents per liter. The density of the resin was 294 grams per liter of bed.

Reduction of the nitro groups in this resin was effected by treating 15.7 parts of the dry resin with 8 parts of sodium sulfide dissolved in 300 parts of 1:1 ammonium hydroxide solution. The mixture was heated on a steam bath for three hours and rinsed free of sulfide. This product had a better acid removal capacity than the non-reduced resin.

*Example 3.*—Nitromethane-formaldehyde and diluted triethylene tetramine solutions were prepared in accordance with the directions given in Example 2. The nitromethane-formaldehyde solution was then cooled in an ice bath, and the amine solution was added very slowly in order to keep the reaction temperature below 35° C. A soft, clear gel formed about 5 minutes after the last of the amine solution was added. Upon heating this gel to 80° C., it gradually changed to an opaque stiff gel. The 80° C. heating was continued for 72 hours, after which the gel was heated at 110° C. for 8 hours. The 33.4 parts of dried gel obtained were crushed to pass through a 16 mesh screen. After placing in hot water in order to avoid serious size reduction during the wetting process, a bed of this product having a depth of about 9 inches was prepared and used for the de-acidification of a water containing 2.5 milliequivalents of sulfuric acid per liter and 1.6 milliequivalents of hydrochloric acid per liter. The resin showed a satisfactory capacity. The density of the resin was found to be 243 grams per liter.

*Example 4.*—To 72 parts of 37% formaldehyde solution were added 9.2 parts of nitromethane and 25 parts of water. This solution was cooled in an ice bath and stirred during the addition of 22 parts of triethylene tetramine at a rate such that the temperature of the reacting mixture was kept below 50° C. There was no gel formation in 16 hours at room temperature, but a gel did form shortly after raising the temperature to 80° C. This gel was dried for 72 hours at 80° C. and 8 hours at 110° C. There were obtained 42.6 parts of dried gel. Large lumps of this dried gel when placed in cold water decrepitated to form particles of 8 mesh and smaller. In order to control the particle size for use in anion exchange processes, the remainder of the dried gel was crushed to pass through a 16 mesh screen and was then placed in hot water. Under these conditions no appreciable decrepitation occurred. This material was then used to prepare a bed 9 inches deep which was subsequently used for the removal of acid from water containing 2.5 milliequivalents of sulfuric acid per liter and 1.5 milliequivalents of hydrochloric acid per liter. Under these conditions the capacity of the resin was 480 milliequivalents per liter. The density of the resin was 201 grams per liter.

*Example 5.*—To 4.6 parts of nitromethane were added 21.5 parts of furfural. 9 parts of triethylene tetramine were diluted with 7.5 parts of water and the solution was cooled to room temperature. The furfural-nitromethane solution was cooled in an ice bath and while stirring, the amine solution was added at a rate such that the reaction temperature was maintained at 15–20° C. After the amine had been completely added, an exothermic reaction continued in the thick liquid. After 5 to 10 minutes this reaction was completed, and the product had changed to an opaque gel. This gel was dried at 80° C. for 72 hours and at 110° C. for 8 hours. The 30 parts of dried resin obtained were crushed to pass through a 16 mesh screen and were wetted by placing in hot water in order to avoid appreciable size reduction. A bed of this resin about 9 inches deep was used to remove the acid from a water containing 2.5 milliequivalents of sulfuric acid per liter and 1.5 milliequivalents of hydrochloric acid per liter. The acid removal capacity of the resin under these conditions was 310 milliequivalents per liter.

*Example 6.*—To 8.9 parts of 1-nitropropane were added 29 parts of 37% formaldehyde solution. 12.7 parts of tetraethylene pentamine were diluted with 15 parts of water and cooled to room temperature. This diluted amine was added to the nitropropane-formaldehyde solution while cooling. During the addition the reaction mixture was kept below 50° C. A gel formed several minutes after the last of the amine was added. The gel was dried at 80° C. for 72 hours and at 110° C. for 8 hours. It was then crushed to suitable size. It showed a capacity of 160 milliequivalents per liter when used in the form of a bed for the removal of acids from a water containing 2.5 milliequivalents of sulfuric acid and 1.5 milliequivalents of hydrochloric acid per liter.

The resins produced according to this invention are well adapted for the treatment of liquids to effect anion exchange reactions. Although the products may be used in powdered or lump form, they are preferably granulated to about 10 to 40 mesh and used in the form of a pervious bed supported in a suitable tank or other vessel by a screen or layer or gravel or similar inert material.

Liquid to be treated, such as water containing an acid, is percolated through this bed between regenerations, and the bed is regenerated when necessary by flushing it with an alkaline solution. A sodium carbonate solution is well suited for use as a regenerant.

These anion exchangers remove anions from the liquid being treated giving up hydroxyl ions to the liquid in exchange therefor. When the liquid treated contains an acid, therefore, the net result is the removal of acid from the liquid. During regeneration, of course, the anions held by the exchanger are liberated and washed away, and the hydroxyl ion content of the exchanger is restored simultaneously.

By the term "anion exchanger" or "anion exchange resin" as used herein, is meant a material substantially insoluble in dilute acids and dilute alkalies but capable of removing acids from aqueous solutions thereof, and capable of being regenerated with an alkaline solution to restore the acid-removing ability of the material.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of preparing an anion exchange resin substantially insoluble in water, dilute acids and dilute alkalies comprising reacting a polyethylene polyamine, formaldehyde and a mononitroalkane having not more than three carbon atoms and having at least two methylol-forming hydrogen atoms until a gel is formed, the molar proportions of reactants being 0.7 to 5 mols of said polyethylene polyamine, one mol of said mononitroalkane and at least two mols of said formaldehyde.

2. A process of preparing an anion exchange resin substantially insoluble in water, dilute acids and dilute alkalies comprising reacting a polyethylene polyamine, furfural and a mononitroalkane having not more than three carbon atoms and having at least two methylol-forming hydrogen atoms until a gel is formed, the molar proportions of reactants being 0.7 to 5 mols of said polyethylene polyamine, one mol of said mononitroalkane and at least two mols of said furfural.

3. A process of preparing an anion exchange resin substantially insoluble in water, dilute acids and dilute alkalies comprising mixing together in solution 0.7 to 5 mols of a polyethylene polyamine containing at least four nitrogen atoms, at least two mols of formaldehyde and one mol of a mononitroalkane having not more than three carbon atoms and having at least two methylol-forming hydrogen atoms.

4. A process of preparing an anion exchange resin substantially insoluble in water, dilute acids and dilute alkalies comprising mixing together in solution one to two mols of a polyethylene polyamine containing at least four nitrogen atoms, at least two mols of formaldehyde and one mol of a mononitroalkane having not more than three carbon atoms and having at least two methylol-forming hydrogen atoms.

5. A process of preparing an anion exchange resin substantially insoluble in water, dilute acids and dilute alkalies comprising mixing together in solution a polyethylene polyamine, formaldehyde and a mononitroalkane having not more than three carbons atoms and having at least two methylol-forming hydrogen atoms to form a gel, the molar proportions of reactants being 0.7 to 5 mols of said polyethylene polyamine, one mol of said mononitroalkane and at least two mols of said formaldehyde, and treating the product with a reducing agent that reduces the nitro groups to amino groups.

6. A process of preparing an anion exchange resin substantially insoluble in water, dilute acids and dilute alkalies in which a polyethylene polyamine is reacted with formaldehyde and a mononitroalkane having not more than three carbon atoms and having at least two methylol-forming hydrogen atoms comprising reacting the formaldehyde and said nitroalkane under alkaline conditions to effect a preliminary condensation thereof before addition of the polyethylene polyamine, the molar proportions of reactants being 0.7 to 5 mols of said polyethylene polyamine, one mol of said mononitroalkane and at least two mols of said formaldehyde.

7. An anion exchange resin substantially insoluble in water, dilute acids and dilute alkalies comprising a dried gel prepared by condensation of a polyethylene polyamine with formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde.

8. An anion exchange resin substantially insoluble in water, dilute acids and dilute alkalies comprising a dried gel prepared by condensation of 0.7 to 5 mols of a polyethylene polyamine containing at least four nitrogen atoms with at least two mols of formaldehyde and one mol of a mononitroalkane having not more than three carbon atoms and having at least two methylol-forming hydrogen atoms.

9. An anion exchange resin substantially insoluble in water, dilute acids and dilute alkalies comprising a dried gel prepared by condensation of one to two mols of a polyethylene polyamine containing at least four nitrogen atoms with at least two mols of formaldehyde and one mol of a mononitroalkane having not more than three carbon atoms and having at least two methylol-forming hydrogen atoms.

10. An anion exchange resin substantially insoluble in water, dilute acids and dilute alkalies comprising a dried gel prepared by condensation of a polyethylene polyamine, formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde, and treating the resulting product with a reducing agent that reduces the nitro groups to amino groups.

11. An anion exchange resin substantially insoluble in water, dilute acids and dilute alkalies comprising a dried gel prepared by condensation of a polyethylene polyamine with formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde, said gel having been dried first at a temperature below 100° C. and thereafter heated for several hours at a temperature of at least 100° C.

12. An anion exchange resin substantially insoluble in water, dilute acids and dilute alkalies comprising a dried gel prepared by condensation of a polyethylene polyamine with a condensation product of furfural and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said furfural.

13. A granular anion exchange resin product substantially insoluble in water, dilute acids and dilute alkalies and capable of being placed in water without extensive decrepitation, said product being a condensation product of a polyethylene polyamine with formaldehyde and a mononitroalkane having not more than three carbon atoms and having at least two methylol-forming hydrogen atoms, the molar proportions of reactants being 0.7 to 5 mols of said polyethylene polyamine, one mol of mononitroalkane and at least two mols of said formaldehyde and said product having been dried and subjected to the action of steam.

14. A process of treating an aqueous solution to effect an exchange of anions comprising contacting said solution with particles of an anion exchange resin substantially insoluble in water, dilute acids and dilute alkalies and prepared by condensation of a polyethylene polyamine with formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde, and separating said resin from the aqueous solution.

15. A process of treating an aqueous solution to effect an exchange of anions comprising contacting said solution with particles of an anion exchange resin substantially insoluble in water, dilute acids and dilute alkalies and prepared by condensation of a polyethylene polyamine with formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde, and treating the resulting products with a reducing agent which reduces the nitro groups and separating said resin from the aqueous solution to amino groups.

16. In a regenerative process of removing acids from liquids in which an anion exchange product is regenerated periodically with an alkaline solution, the step of passing the liquid containing an acid into intimate contact with granules of a condensation product of a polyethylene polyamine, formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde and said granules consisting of particles that have been dried first at a temperature below 100° C., and subsequently heated at a temperature of at least 100° C. and separating said condensation product from the liquid.

17. In a process of preparing an anion exchange resin substantially insoluble in water, dilute acids and dilute alkalies and produced by reacting a polyethylene polyamine, formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde, the steps of forming a gel, drying said gel at a temperature below 100° C. and thereafter heating the dried gel for several hours at a temperature substantially above 100° C.

18. In a process of preparing an anion exchange resin substantially insoluble in water, dilute acids and dilute alkalies and produced by reacting a polyethylene polyamine, formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde, the steps of forming a gel, drying said gel and subjecting the dried product to decrepitation under controlled temperature conditions to regulate the size of the particles obtained, the temperature of the water being higher for the production of larger particles.

19. In a process of preparing an anion exchange resin substantially insoluble in water, dilute acids and dilute alkalies and produced by reacting a polyethylene polyamine, formaldehyde and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said formaldehyde, the steps of forming a gel, drying said gel and treating the dried product with steam to minimize decrepitation when it is subsequently placed in water.

20. A process of preparing an anion exchange resin substantially insoluble in water, dilute acids and dilute alkalies comprising forming a gel by reacting 0.7 to 5 mols of a polyethylene polyamine with at least two mols of an aldehyde selected from the class consisting of formaldehyde, furfural, monosaccharides and disaccharides and one mol of a mononitroalkane having not more than three carbon atoms and having at least two methylol-forming hydrogen atoms.

21. An anion exchange resin substantially insoluble in water, dilute acids and dilute alkalies comprising a dried gel prepared by condensation of 0.7 to 5 mols of a polyethylene polyamine with at least two mols of an aldehyde selected from the class consisting of formaldehyde, furfural, monosaccharides and disaccharides and one mol of a nitroalkane having not more than three carbon atoms and having at least two methylol-forming hydrogen atoms.

22. A process of treating an aqueous solution to effect an exchange of anions comprising contacting said solution with particles of an anion exchange resin substantially insoluble in water, dilute acids and dilute alkalies and prepared by condensation of a polyethylene polyamine with an aldehyde selected from the class consisting of formaldehyde, furfural, monosaccharides and disaccharides and a mononitroalkane having not more than three carbon atoms and having at least two methylol-forming hydrogen atoms, the molar proportions of reactants being 0.7 to 5 mols of said polyethylene polyamine, one mol of said mononitroalkane and at least two mols of said aldehyde, and separating said resin from the aqueous solution.

SIDNEY SUSSMAN.

REFERENCES CITED

The following references are of record in the file of this patent:

UNITED STATES PATENTS

| Number | Name | Date |
|---|---|---|
| 2,251,234 | Swain | July 29, 1941 |
| 2,259,169 | Little | Oct. 14, 1941 |
| 2,355,402 | Sussman | Aug. 8, 1944 |
| 2,356,151 | Eastes | Aug. 22, 1944 |
| 2,362,086 | Myers | Nov. 7, 1944 |
| 2,373,549 | D'Alelio | Apr. 10, 1945 |
| 2,388,235 | Bowman | Nov. 6, 1945 |
| 2,392,105 | Sussman | Jan. 1, 1946 |
| 2,426,128 | Trowell | Aug. 19, 1947 |